US011670000B1

(12) United States Patent
Barsky et al.

(10) Patent No.: US 11,670,000 B1
(45) Date of Patent: Jun. 6, 2023

(54) SYSTEMS AND METHODS FOR THE ACCURATE MAPPING OF IN-FOCUS IMAGE DATA FROM TWO-DIMENSIONAL IMAGES OF A SCENE TO A THREE-DIMENSIONAL MODEL OF THE SCENE

(71) Applicant: Illuscio, Inc., Culver City, CA (US)

(72) Inventors: Kevan Spencer Barsky, Santa Monica, CA (US); Nicholas Frank Hammerle, Los Angeles, CA (US)

(73) Assignee: Illuscio, Inc., Culver City, CA (US)

( * ) Notice: Subject to any disclaimer, the term of this patent is extended or adjusted under 35 U.S.C. 154(b) by 0 days.

(21) Appl. No.: 18/149,824

(22) Filed: Jan. 4, 2023

(51) Int. Cl.
*G06T 7/73* (2017.01)
*G06T 7/90* (2017.01)
*G06T 7/521* (2017.01)

(52) U.S. Cl.
CPC ............... *G06T 7/75* (2017.01); *G06T 7/521* (2017.01); *G06T 7/90* (2017.01); *G06T 2207/10024* (2013.01); *G06T 2207/10028* (2013.01)

(58) Field of Classification Search
CPC .. G06T 7/75; G06T 7/521; G06T 7/90; G06T 2207/10024; G06T 2207/10028
USPC ........................................................ 382/162
See application file for complete search history.

(56) References Cited

U.S. PATENT DOCUMENTS

| 2003/0016218 | A1* | 1/2003 | Zwicker | G06T 15/04 345/424 |
| 2003/0071194 | A1* | 4/2003 | Mueller | G06T 7/80 348/E13.016 |
| 2003/0151611 | A1* | 8/2003 | Turpin | G06F 3/04845 345/589 |
| 2005/0237336 | A1* | 10/2005 | Guhring | G06T 15/08 345/582 |
| 2006/0017741 | A1* | 1/2006 | Sekine | G06T 15/04 345/582 |
| 2018/0098047 | A1* | 4/2018 | Itakura | H04N 13/279 |
| 2021/0280322 | A1* | 9/2021 | Frank | G16H 50/20 |

\* cited by examiner

*Primary Examiner* — Ali Bayat
(74) *Attorney, Agent, or Firm* — Ansari Katiraei LLP; Arman Katiraei; Sadiq Ansari

(57) ABSTRACT

Disclosed is an imaging system and associated methods for mapping in-focus image data from two-dimensional ("2D") images of a scene to a three-dimensional ("3D") model of the scene. The imaging system receives the 2D images and the 3D model, determines the depth of field ("DOF") and the field of view ("FOV") for each 2D image, and selects a subset of 3D model constructs that form the FOV and are within the DOF of a particular 2D image. The imaging system determines pixels of the particular 2D image that represent a same set of points in the scene as the subset of 3D model constructs, and maps the visual characteristics from those pixels to non-positional elements of the subset of 3D model constructs.

20 Claims, 7 Drawing Sheets

US 11,670,000 B1

SYSTEMS AND METHODS FOR THE ACCURATE MAPPING OF IN-FOCUS IMAGE DATA FROM TWO-DIMENSIONAL IMAGES OF A SCENE TO A THREE-DIMENSIONAL MODEL OF THE SCENE

BACKGROUND

A scanner uses time-of-flight, angle-of-incidence, structured light, and/or other measurements or techniques to create a three-dimensional ("3D") model of a scene. The 3D model includes polygons, meshes, points, and/or other constructs that are accurately positioned in a 3D space to mirror the positions of surfaces or objects detected by the scanner at corresponding positions in the scene.

While the scanner accurately maps the surface or object positions, it does not capture the visual characteristics (e.g., color) of those surfaces. In other words, the 3D model replicates the shape and form of the scene without the corresponding color.

A camera or other imaging device is used to separately capture the visual characteristics of the scene, and the visual characteristics are mapped from the 2D images captured by the camera or other imaging device onto the constructs of the 3D model. The color mapping is inaccurate because of the focal range of camera. Specifically, some parts of the 2D image are in-focus and accurately capture the visual characteristics of the imaged surfaces or objects that are in focus, and other parts of the 2D image are out-of-focus and inaccurately capture the visual characteristics for the out-of-focus surfaces or objects. For instance, the out-of-focus parts may be blurry with the color of a particular surface or point bleeding over or blending with the color of one or more neighboring surfaces or points that are represented by different constructs in the 3D model. Consequently, the color that is mapped from the out-of-focus parts of the 2D image do not accurately represent the color for the constructs of the 3D model at positions corresponding to the out-of-focus parts of the 2D image, and the resulting color-mapped 3D model is an inaccurate visual representation of the scene.

DETAILED DESCRIPTION OF PREFERRED EMBODIMENTS

Figure 1:
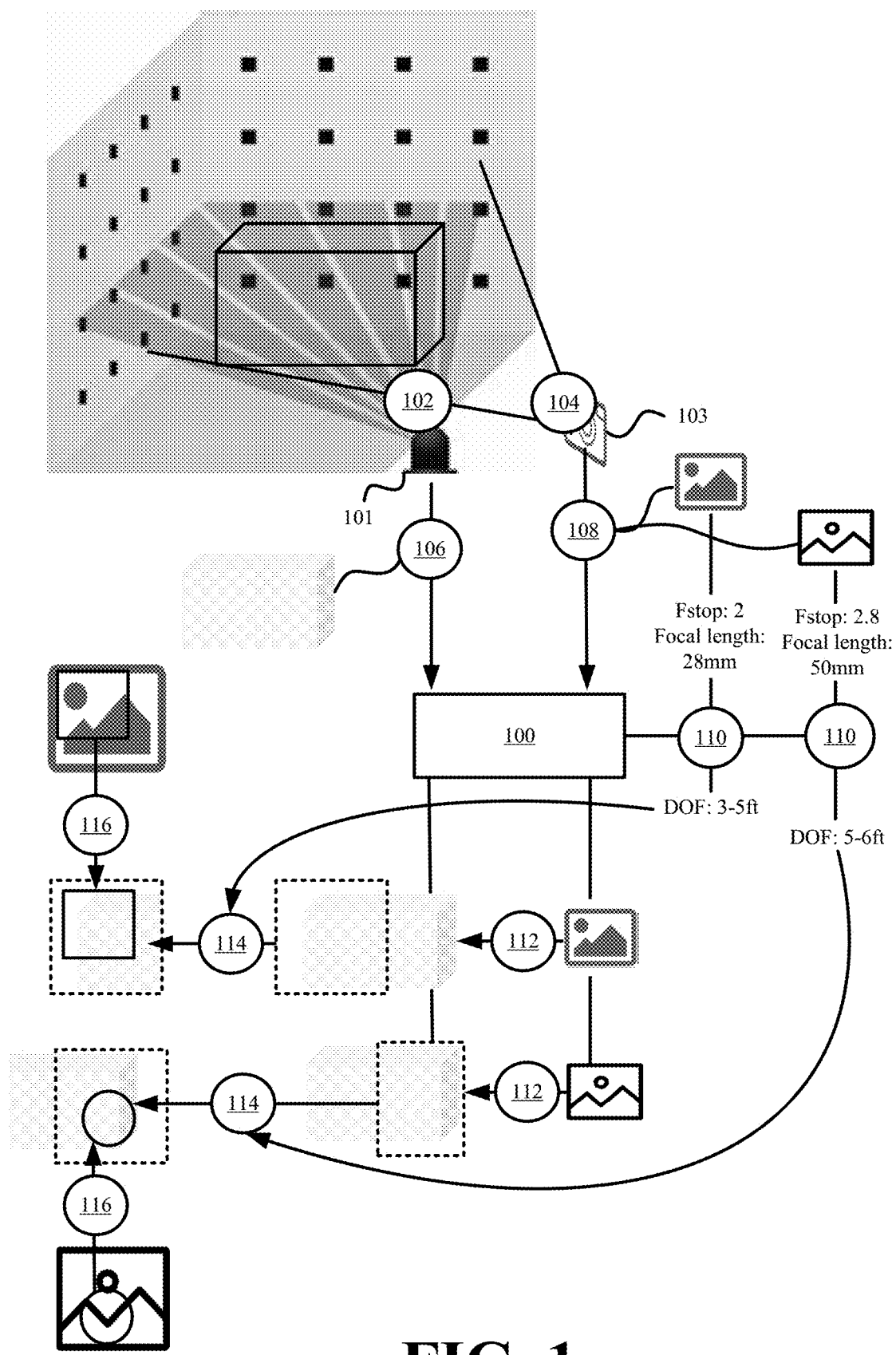
FIG. 1 illustrates an example of performing the color accurate mapping from two-dimensional ("2D") images to constructs of a three-dimensional ("3D") model in accordance with some embodiments presented herein.

The following detailed description refers to the accompanying drawings. The same reference numbers in different drawings may identify the same or similar elements.

Provided are systems and methods for the accurate mapping of in-focus image data from two-dimensional ("2D") images of a scene to a three-dimensional ("3D") model of the scene. An imaging system determines parts of the 2D images that are in focus based on the imaging settings that were configured when taking the 2D images. Specifically, the imaging system computes the depth of field ("DOF") corresponding to the distance or range from the camera that is in focus based on the camera aperture (e.g., aperture size and range), lens focal length, sensor size, focus setting, circle of confusion, and/or other settings that are recorded as part of the 2D image metadata. The imaging system determines the field of view ("FOV") associated with each 2D image to identify the meshes, polygons, points (e.g., point cloud data points), and/or other constructs from the 3D model for the surfaces or objects that are in the FOV of each 2D image. The imaging system selects a set of the identified constructs that are in the FOV of a particular 2D image and that have positions that are within the DOF computed for that particular 2D image. The imaging systems maps the positions of the selected set of constructs in the FOV and DOF of the particular 2D image to a set of in-focus pixels that make up that particular 2D image DOF, and attributes the color and/or other visual characteristics from the set of in-focus pixels to the 3D model constructs that are positionally aligned and represent the same surfaces or objects as the set of in-focus pixels. The imaging system may map the color and/or other visual characteristics from different 2D images that capture the scene with different FOVs and/or DOFs so that each construct of the 3D model receives in-focus and accurate color information, and not blurry and out-of-focus color information that bleeds or blends over and/or across multiple pixels.

Accordingly, the imaging system produces color-accurate 3D models of the scene in which every mesh, polygon, point, or other construct of the 3D model is provided accurate color information from an in-focus pixel of a 2D image that captures the visual characteristics of a surface, object, or point of the scene in the DOF of the camera with sufficient sharpness to ensure that the visual characteristics are of that surface, object, or point and not a blended or mixed representation of visual characteristics from neighboring surfaces, objects, or points. In other words, a construct of the 3D model that accurately represents the positioning of a particular point from a surface of the scene receives the color information for that same particular point as captured in the DOF of a 2D image, and not the color information from neighboring surface points or distorted color information when that particular point is captured outside the 2D image DOF.

FIG. 1 illustrates an example of performing the color accurate mapping from 2D images to constructs of a 3D model in accordance with some embodiments presented herein. FIG. 1 includes imaging system 100, scanner 101, and camera 103.

In some embodiments, scanner 101 is one or more of a Light Detection and Ranging ("LiDAR") scanner, Magnetic Resonance Imaging ("MRI") device, Positron Emission Tomography ("PET") scanning device, Computerized Tomography ("CT") scanning device, and/or other 3D imaging or scanning device. Scanner 101 generates (at 102) a 3D model of a scene using time-of-flight, angle-of-incidence, structured light, and/or other 3D imaging techniques. For instance, scanner 101 emits or projects lasers, light, or other signaling at different offset angles, measures the return intensity of the signal reflecting off a surface point, and calculates the position of the surface point based on the return intensity and/or other characteristics of the reflected signal. Scanner 101 generates a mesh, polygon, point cloud data point, or other construct for every detected or scanned surface point at a corresponding position in a 3D space of the 3D model. Accordingly, scanner 101 recreates the exact shape, form, and positioning of objects and surfaces in a scene by representing the position of each detected or scanned surface point with a construct at a corresponding position in the 3D space of the 3D model.

Scanner 101 does not capture or inaccurately captures the visual characteristics for the surface points that are represented by the constructs of the 3D model. Accordingly, camera 103 is used for the accurate capture of the scene visual characteristics. Camera 103 is a 2D imaging device with a Complementary Metal Oxide Semiconductor ("CMOS"), charge coupled device ("CCD"), or other imaging sensor that captures (at 104) visual characteristics including various color components (e.g., red, green, blue, etc.), brightness, contrast, hue, saturation, and the like accurately and precisely.

In some embodiments, camera 103 captures (at 104) the 2D images from the same one or more positions as scanner 101 so that the FOV of the 2D images encompasses the same surfaces or objects that are scanned by scanner 101. In some such embodiments, camera 103 and scanner 101 are mounted to the same rig, and are activated at the same time. In some other embodiments, one or more of camera 103 and scanner 101 is positioned at a location in the scene and activated, before the other device is positioned and activated at the same or different location. In other words, camera 103 may capture (at 104) the scene from a first FOV, and scanner 101 may scan (at 102) the scene from a different second FOV. The first FOV and the second FOV may be established from different positions in the scene, from different perspectives of the scene, and/or with different surfaces of the scene being exposed to camera 103 than scanner 101.

Camera 103 has configurable settings that change the DOF that is in focus when imaging the scene. For instance, the configurable settings include one or more of the camera aperture, lens focal length, focus setting, and/or other focusing or imaging properties of camera 103. Accordingly, a first set of settings cause camera 103 to capture the visual characteristics of the scene with a first DOF such that the objects and the surfaces that are a first distance or range from camera 103 are in focus, and a second set of settings cause camera 103 to capture the visual characteristics of the scene with a second DOF such that the objects and the surfaces that are a second distance or range from camera 103 are in focus. The visual characteristics for objects or surfaces that are out-of-focus are inaccurate because those objects or surfaces are imaged with lower granularity, detail, or specificity. In other words, the pixels representing the out-of-focus objects or surfaces do not have the same sharpness as the pixels representing the in-focus objects or surfaces. Consequently, the visual characteristics for a specific point of an out-of-focus object or surface may be captured with distortion or noise, or may be blurred or blended with the visual characteristics of neighboring points from the same or different surfaces or objects.

The settings used to capture a particular image are associated with that particular image. In some embodiments, the settings are stored as part of the particular image metadata. Other image metadata includes the make and model of camera 103, properties of the camera imaging sensor (e.g., sensor size, resolution, etc.), and/or properties of the lens used to capture an image.

Imaging system 100 receives (at 106) the meshes, polygons, points, or other constructs that are distributed in a 3D space to recreate the scene as a 3D model from scanner 101, and receives (at 108) one or more 2D images of the scene from camera 103. Imaging system 100 determines (at 110) the DOF for each of the one or more 2D image based on the metadata of each image. The DOF identifies the range or distance from camera 103 at which the captured objects or surfaces are in focus.

Imaging system 100 determines (at 112) the FOV of each 2D image. The FOV identifies which surfaces or objects from the scene are captured in each 2D image, and/or the region of the scene that is captured in each 2D image. In some embodiments, determining (at 112) the FOV includes identifying the 3D model constructs that represent the surfaces or objects that are captured in each image. Specifically, imaging system 100 may scale, rotate, and/or transform the constructs so that the set of constructs that represent the surfaces or objects that are captured in each image are aligned with the pixels representing those surfaces or objects in the 2D images.

Imaging system 100 selects (at 114) the in-focus pixels to be the pixels that are aligned with constructs having depth values within the DOF. Specifically, each mesh, polygon, point, or other construct of the 3D model includes a set of positional elements that define the position of that construct in the 3D space represented by the 3D model. For instance, the set of positional elements may include x, y, and z coordinates. Accordingly, imaging system 100 determines the set of constructs that are positioned in the FOV of a particular image (e.g., form the surfaces, objects, or other structures that are represented by the pixels of the particular image), and selects (at 114) the pixels that are aligned with a subset of the set of constructs with depth values within the DOF determined (at 110) for the particular image.

Imaging system 100 attributes (at 116) the visual characteristics of the selected (at 114) in-focus pixels to the set of constructs that align or are at the same 2D position as those pixels. Attributing (at 116) the visual characteristics from a particular in-focus pixel to an aligned 3D model construct includes copying the color component values, brightness, contrast, hue, saturation, and/or other visual properties of the particular in-focus pixel to corresponding non-positional elements of the aligned 3D model construct that is in the image FOV, that represent the same surface, feature, or point in the scene as the particular in-focus pixel (e.g., has x and y coordinate positional values in the 3D space of the 3D model that align with the surface, feature, or point in the scene represented by the particular in-focus pixel), and that has a z coordinate positional value in the DOF. In other words, the aligned 3D model construct and the particular in-focus pixel represent the same point of the same surface or object in the scene. The set of non-positional element of the aligned 3D model construct are therefore overwritten with the color component values, brightness, contrast, hue, saturation, and/or other visual properties that are defined for the particular in-focus pixel.

As shown in FIG. 1, imaging system 100 attributes (at 116) the visual characteristics from different sets of pixels of different 2D images to different sets of 3D model constructs from the same 3D model. The different 2D images capture the scene with different FOVs and/or DOFs such that different parts of the scene are in focus in the different 2D images. Imaging system 100 uses the visual characteristics from the in-focus pixels of the different 2D images to ensure that each construct of the 3D model is defined with accurate visual characteristics from an in-focus pixel irrespective of which 2D image of the scene captures the accurate visual characteristics and/or in-focus pixel for the surface, feature, object, or point represented by each construct.

Imaging system 100 generates a complete 3D model of the scene based on the positional data output by scanner 101, and the visual characteristics from the in-focus pixels of the 2D images. The completed 3D model accurately and precisely mirrors the position of each surface, feature, object, or point of the scene, and accurately and precisely recreates the colors and/or other visual characteristics of each surface, feature, object, or point across the constructs created at the mirrored positions for each surface, feature, object, or point.

Figure 2:
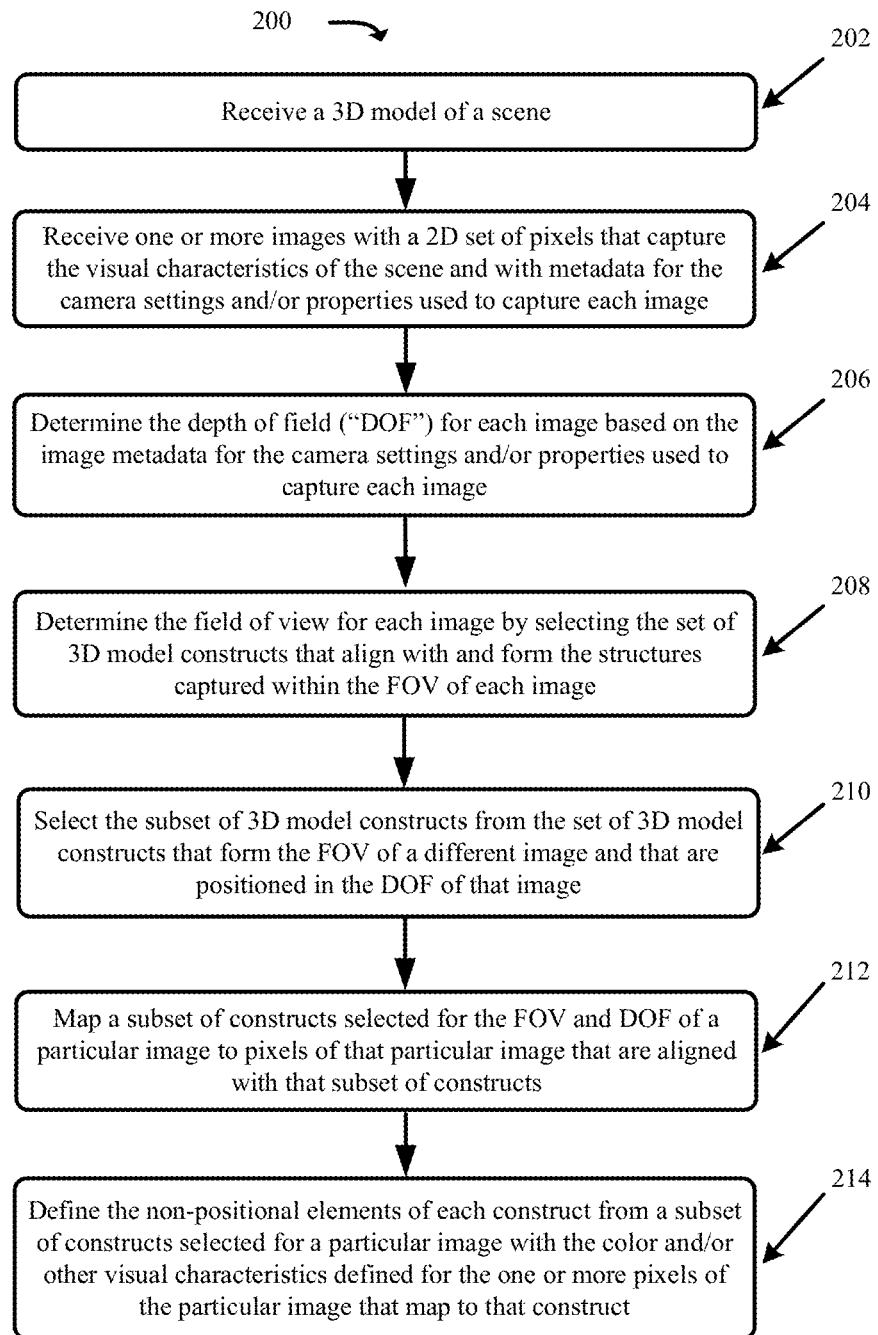
FIG. 2 presents a process for producing the color-accurate 3D model from combining in-focus visual characteristics of 2D image data with 3D positional data of the 3D model constructs in accordance with some embodiments presented herein.

FIG. 2 presents a process 200 for producing the color-accurate 3D model from combining in-focus visual characteristics of 2D image data with 3D positional data of the 3D model constructs in accordance with some embodiments presented herein. Process 200 is implemented by imaging system 100. Imaging system 100 is a device that interfaces with scanner 101 and camera 103, and/or that receives the 3D positional data that is output by scanner 101 and the 2D images output by camera 103. Imaging system 100 includes one or more hardware processors, memory, storage, network, and/or other hardware resources for combining the in-focus visual characteristics of 2D image data produced by camera 103 with the 3D positional data generated by scanner 101 in order to generate the color-accurate 3D model.

Process 200 includes receiving (at 202) a 3D model of a scene. The 3D model may be created by scanner 101 and/or other scanning devices or techniques for 3D modeling of the scene. The 3D model includes meshes, polygons, points, or other constructs that are distributed in a 3D space to accurately recreate the positioning of scanned points from surfaces, features, or objects of the scene. Each construct is defined with a set of positional elements for the 3D positioning (e.g., x, y, and z coordinates) of that construct in the 3D space, and a blank or inaccurate set of non-positional elements for the visual characteristics of the construct that initially contain null or invalid values.

Process 200 includes receiving (at 204) one or more images with a 2D set of pixels that capture the visual characteristics of the scene, and with metadata for the camera settings and/or properties used to capture each image. In some embodiments, the one or more images capture the scene from different orientations, distances, positions, perspectives, DOFs, and/or FOVs so that the images provide an in-focus capture of all sides, elements, and/or features of the scene represented by the 3D model. Accordingly, each image may have a different part or FOV of the scene in focus. The visual characteristics correspond to the red, green, blue, and/or other color components, brightness, contrast, hue, saturation, and/or other visual aspects of the imaged scene.

In some embodiments, the one or more images may capture the same FOV with different DOFs. In some such embodiments, imaging system 100 may perform focus stacking to combine the DOFs from the different images and to produce one image with a DOF and in-focus pixels that span the different DOFs of the one or more images. In other words, imaging system 100 combines the in-focus pixels from the different images in a single pixel that has a greater DOF than any of the individual images of the same FOV.

Process 200 includes determining (at 206) the DOF for each image based on the image metadata for the camera settings and/or properties used to capture each image. Determining (at 206) the DOF includes using the camera aperture (e.g., aperture size and range), lens focal length, focus settings, sensor size, circle of confusion, and/or other settings or properties to compute the DOF or the distance and range from camera 103 at which the pixels for the imaged surfaces, features, elements, and/or objects are in focus. The DOF is defined with a near value and a far value. The near value specifies the closest distance to camera 103 that is in focus, and the far value specifies the farthest distance from camera 103 that is in focus. In some embodiments, determining (at 206) the DOF includes calculating the DOF based on the DOF formula below:

$$(2*u^2*N*c)/(f^2) \qquad (1)$$

In the DOF formula, u represents the subject distance, N represents the f-number or aperture setting, c represents the circle of confusion, and f represents the focal length. The circle of confusion is a property of the camera lens.

In some embodiments, determining (at 206) the DOF includes factoring in other metadata such as the sensor size, sensor sensitivity, lighting, etc. The DOF determination (at 206) may be enhanced with other techniques including performing a contrast comparison to further refine the near and far values for the DOF. For instance, the contrast comparison may identify parts or pixels of an image that are "sharp" and in-focus and other parts or pixels that are "soft" and out-of-focus. The soft parts or pixels include pixels where the difference in contrast between neighboring pixels is less than a threshold, whereas the sharp parts or pixels correspond to neighboring pixels in which the different in contrast between the neighboring pixels exceeds the threshold.

Process 200 includes determining (at 208) the FOV for each image. In some embodiments, determining (at 208) the FOV includes identifying and selecting the set of 3D model constructs that form or represent the shapes, structures, features captured in each image. In other words, imaging system 100 determines (at 208) the FOV for an image by selecting the set of constructs that align with and form the structures captured within the FOV of that image.

In some embodiments, imaging system 100 scales, rotates, and/or transforms the 3D model until the forms produced by the constructs falling in the FOV of the 3D model align with the forms that are captured in the image FOV. In some such embodiments, imaging system 100 may overlay a 2D image over a rendering of the 3D model, and may scale, rotate, and/or transform the rendering until the 3D model rendering aligns with the overlaid 2D image. In some embodiments, imaging system 100 performs an image analysis to detect edges, differentiates surfaces based on coloring, match shapes in the images with recognized objects, and/or otherwise differentiate between different surfaces, elements, features, and/or objects in an image FOV, and performs pattern or shape recognition to identify sets of 3D model constructs with positional elements that form the shapes of the differentiated surfaces, elements, features, and/or objects.

Process 200 includes selecting (at 210) the subset of 3D model constructs from each set of 3D model constructs that form the FOV of a different image and that are positioned in the DOF of that image. Accordingly, imaging system 100 inspects the set of positional elements of the 3D model constructs, to determine which constructs are within the particular image DOF (e.g., the selected set of constructs) and which constructs are outside the particular image DOF.

Process 200 includes mapping (at 212) a subset of constructs selected for the FOV and DOF of a particular image to pixels of that particular image that are aligned with that subset of constructs. In some embodiments, the 3D position (e.g., x, y, and z coordinates) defined for a construct maps (at 212) to a particular point about a surface or object in the scene, and imaging system 100 identifies the pixel from the particular image that captures that same particular point of the scene.

Process 200 includes defining (at 214) the non-positional elements of each construct from a subset of constructs selected (at 210) for a particular image with the color and/or other visual characteristics defined for the one or more pixels of the particular image that map (at 212) to that construct. In some embodiments, the subset of constructs corresponds to points of a point cloud with each point being smaller than or equal to the size of a pixel of the particular image. In some such embodiments, defining (at 214) the non-positional elements of that point (e.g., the point cloud data point) includes replacing the red, green, blue, and/or other color components of the non-positional elements for that point with the corresponding color component values for the pixel of the particular image that maps (at 212) to that point. In some embodiments, the subset of constructs corresponds to meshes or polygons that may be larger in size than a single pixel. In some such embodiments, imaging systems 100 determines the two or more pixels from the particular image that are mapped (at 212) to a particular construct, interpolates or combines the attributes of the two or more pixels into a single set of values, and defines (at 214) the non-positional elements of the particular constructs with that single set of values.

Process 200 repeats selecting (at 210) the subset of constructs in the FOV and DOF of each of the received (at 204) images, mapping (at 212) the subset of constructs to pixels of the corresponding image, and defining (at 214) the non-positional elements for each subset of constructs until all constructs of the 3D model are defined with visual characteristics from an in-focus pixel or until the visual characteristics from all in-focus pixels of the received (at 204) images have been attributed to a 3D model construct. Accordingly, imaging system 100 may assign the color and/or other visual characteristics of different sets of pixels from two or more images that are in focus at different DOFs to the constructs of the 3D model in order to generate the color-accurate 3D model.

Figure 3:
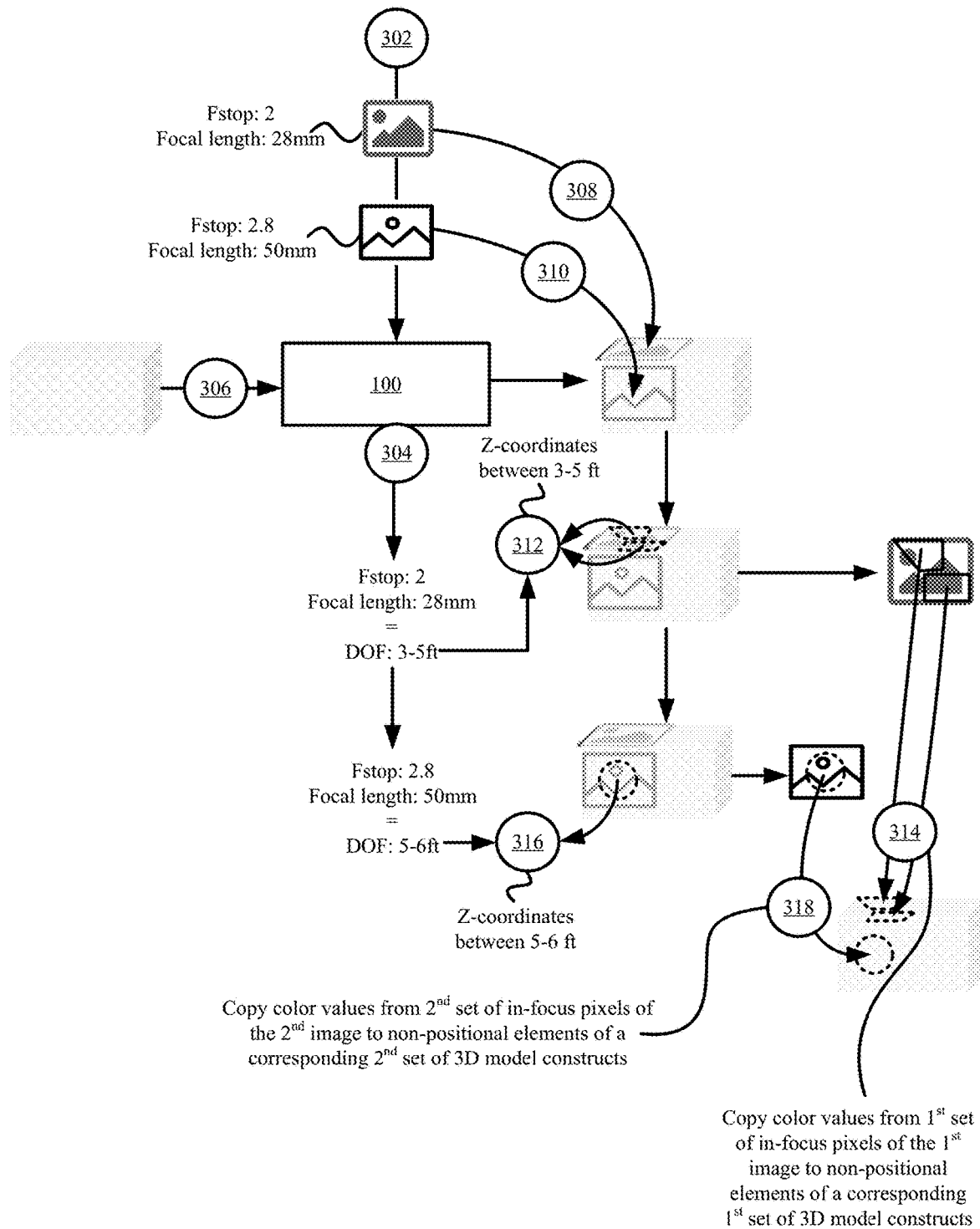
FIG. 3 illustrates an example determining and mapping the in-focus visual characteristics of 2D image data to constructs of a 3D model in accordance with some embodiments presented herein.

FIG. 3 illustrates an example determining and mapping the in-focus visual characteristics of 2D image data to constructs of a 3D model in accordance with some embodiments presented herein. Imaging system 100 receives (at 302) first and second images with metadata for the different camera settings used to capture each image.

Imaging system 100 analyzes the camera settings associated with each image, and computes (at 304) a different DOF for each image based on the camera settings. For instance, the first image was captured with a first combination of aperture, lens focal length, and focus settings, and the second image was captured with a different combination of aperture, lens focal length, and focus settings. Imaging system 100 computes a first DOF for the first image based on the first combination of camera settings used to capture the first image, and a second DOF for the second image based on the second combination of camera settings used to capture the second image.

In some embodiments, imaging system 100 performs focus stacking when the first and second images are of the same FOV. For instance, imaging system 100 combines the first and second images into a single image that retains the in-focus pixels within the DOF of each image.

Imaging system 100 obtains (at 306) a 3D model for the object or scene captured in the first and second images. Imaging system 100 determines the FOV of the first image, and selects (at 308) a first set of constructs from the 3D model that provide a 3D representation for the first image FOV. For instance, imaging system 100 determines that the first set of 3D model constructs form structures that match the positioning of those same structures represented by the pixels of the first image. Imaging system 100 also determines the FOV of the second image, and selects (at 310) a second set of constructs from the 3D model that provide a 3D representation for the second image FOV.

Imaging system 100 compares the positional elements and/or z-depth positioning of the first set of 3D model constructs to the first DOF of the first image, and selects (at 312) a first subset of the first set of 3D model constructs that are within the first DOF (e.g., have a z-depth positioning in the first DOF). For instance, the first DOF may have a near field value of 3 feet and a far field value of 5 feet, and the first subset of constructs may be defined with a z-depth positioning that is between 3 feet and 5 feet.

Imaging system 100 identifies a first set of pixels from the first image that are aligned with the first set of constructs and/or provide a 2D representation for the 3D structures represented by the first set of constructs that are in the first image FOV and DOF. Imaging system 100 defines (at 314) the non-positional elements of each construct from the first set of constructs with the visual characteristics of an aligned pixel from the first set of pixels.

Imaging system 100 compares the positional elements and/or z-depth positioning of the second set of 3D model constructs to the second DOF of the second image, and selects (at 316) a second subset of the second set of 3D model constructs that are within the second DOF (e.g., have a z-depth positioning in the second DOF). Imaging system 100 identifies a second set of pixels from the second image that are aligned with the second set of constructs and/or provide a 2D representation for the 3D structures represented by the second set of constructs that are in the second image FOV and DOF. Imaging system 100 defines (at 318) the non-positional elements of each construct from the second set of constructs with the visual characteristics of an aligned pixel from the second set of pixels.

As demonstrated in the examples above, it is unlikely that a single 2D image captures a 3D scene from all perspectives such that all surfaces within the scene are within the FOV of a single 2D image or can be captured in the DOF spanned by a single 2D image. Instead, multiple images with different DOFs and FOVs are needed to obtain pixels that are in-focus and therefore capture the visual characteristics for all surfaces with sufficient contrast and/or sharpness to represent the true visual characteristics of individual points about the surfaces rather than blended visual characteristics of neighboring points.

In some embodiments, imaging system 100 automatically configures a camera to perform bracketed photography with different camera settings. The bracketed photography produces multiple captures of the scene that collectively capture all points within the scene from a given position in focus and with the distinct visual characteristics of those individual points preserved.

Figure 4:
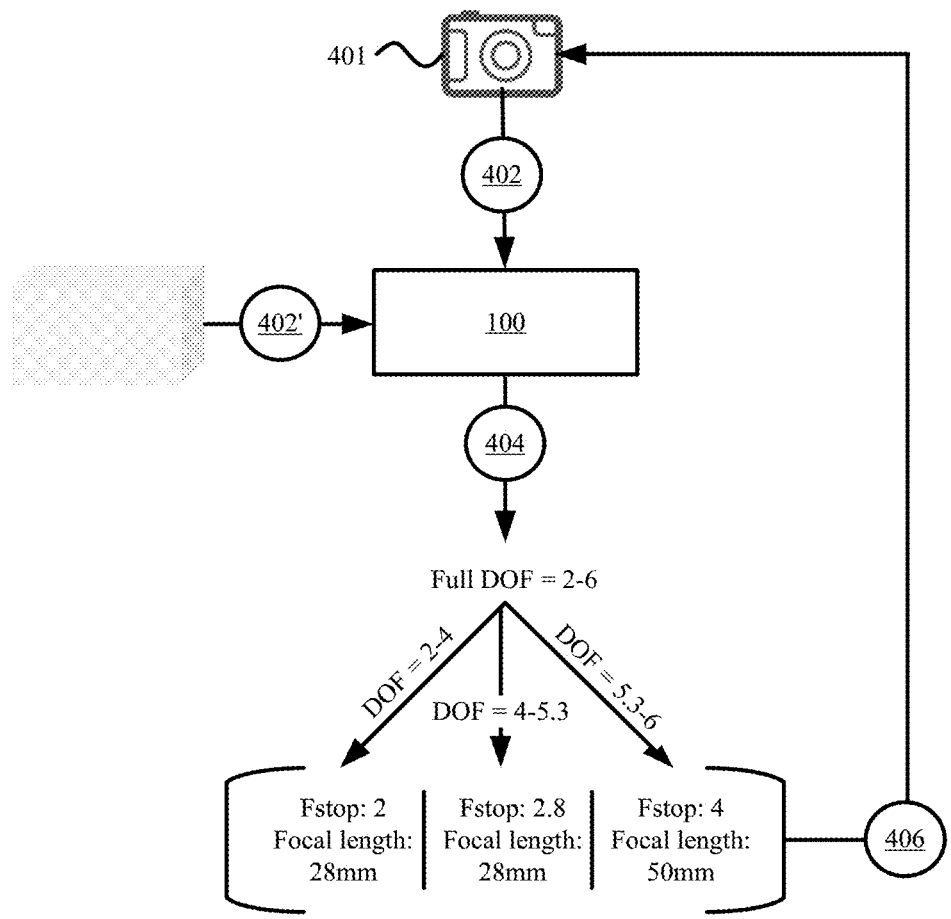
FIG. 4 illustrates an example of automatically configuring camera settings to obtain in-focus 2D image data for all constructs of a 3D model from a particular perspective in accordance with some embodiments presented herein.

FIG. 4 illustrates an example of automatically configuring camera settings to obtain in-focus 2D image data for all constructs of a 3D model from a particular perspective in accordance with some embodiments presented herein. Imaging system 100 is connected to and/or communicably coupled to camera 401.

Imaging system 100 obtains (at 402) a live feed or sample image of a scene from the sensor of camera 401, and analyzes the live feed or sample image to determine (at 404) the full DOF needed for an in-focus capture of the scene from the particular perspective or FOV of camera 401. Specifically, imaging system 100 determines that the full DOF is greater than a DOF that can be captured with a single image.

In some embodiments, imaging system 100 obtains (at 402') a 3D model of the scene with positional elements that accurate track and/or map to individual points within the scene, and with non-positional elements that are defined with null or inaccurate values. Imaging system 100 may analyze the positional elements of the 3D model constructs to determine (at 404) the full DOF needed for an in-focus capture of the entire scene.

Imaging system 100 configures (at 406) camera 401 to perform bracketed photography in which a single activation of camera 401 causes camera 401 to capture two or more images with different DOFs. Specifically, imaging system 100 configures (at 406) different camera settings for each capture defined for the bracketed photography. The different camera settings change the DOF for each capture defined for the bracketed photography. For instance, imaging system 100 configures (at 406) a first set of camera settings for a first capture of the bracketed photography so that the first capture captures the scene with a first DOF, configures (at 406) a second set of camera settings for a second capture of the bracketed photography so that the second capture captures the scene with a different second DOF, and configures (at 406) a third set of camera settings for a third capture of the bracketed photography so that the third capture captures the scene with a different third DOF. The first, second, and third DOF span the full DOF needed to capture in-focus image data for all constructs of the 3D model that are visible from the particular perspective or FOV of camera 401.

Activation of camera 401 causes camera 401 to capture a first image with the first DOF using the first camera settings, capture a second image with the second DOF using the second camera settings, and capture a third image with the third DOF using the third camera settings. Imaging system 100 may perform focus stacking to combine the in-focus pixels from each captured image into a single image with a DOF that spans the first, second, and third DOF of the three combined images.

Imaging system 100 then performs the color-accurate mapping of the in-focus image data from the three images or from the focus stacked image to different sets of constructs from the 3D model. In particular, the different sets of constructs are in the FOV of the three images or the focus stacked image with each set of constructs having positions that are within the DOF of a single image and that are defined with the visual characteristics from the in-focus pixels of that image that are positionally aligned with that set of constructs.

In some embodiments, imaging system 100 may generate the camera settings to capture in-focus image data for constructs of a 3D model that remain undefined. For instance, the camera may take one or more images that are used to provide visual characteristics from in-focus pixels to a first set of constructs of the 3D model. However, a second set of constructs of the 3D model may be outside the FOV and/or DOF of the one or more images such that the non-positional elements of the second set of constructs may remain undefined.

Figure 5:
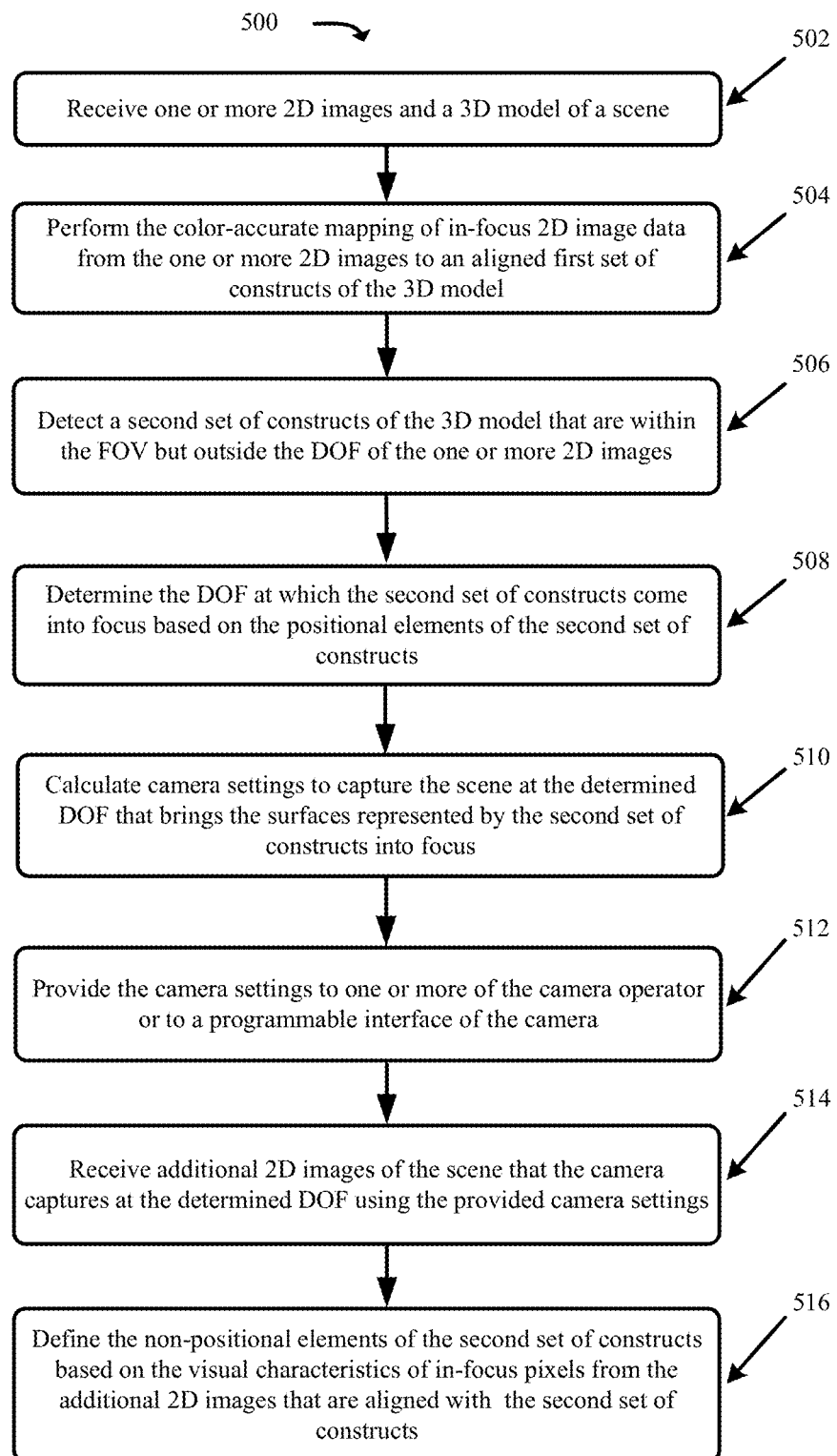
FIG. 5 presents a process for obtaining in-focus image data for constructs of a 3D model that remain undefined in accordance with some embodiments presented herein.

FIG. 5 presents a process 500 for obtaining in-focus image data for constructs of a 3D model that remain undefined in accordance with some embodiments presented herein. Process 500 is performed by imaging system 100.

Process 500 includes receiving (at 502) one or more 2D images of a scene that is the subject for the color-accurate mapping, and a 3D model of that scene. Process 500 includes performing (at 504) the color-accurate mapping of in-focus 2D image data from the one or more 2D images to an aligned first set of constructs of the 3D model.

Process 500 includes detecting (at 506) a second set of constructs of the 3D model that are within the FOV but outside the DOF of the one or more 2D images. Accordingly, the one or more 2D images do not contain in-focus image data for the surfaces represented by the second set of constructs, and the non-positional elements of the second set of constructs remain undefined.

Process 500 includes determining (at 508) the DOF at which the second set of constructs come into focus based on the positional elements of the second set of constructs. Determining (at 508) the DOF may include determining the z-coordinate range spanned by the second set of constructs, or determining a difference in depth between the first set of constructs and the second set of constructs.

Process 500 includes calculating (at 510) camera settings to capture the scene at the determined (at 508) DOF that brings the surfaces represented by the second set of constructs into focus. Calculating (at 510) the camera settings includes calculating a value for one or more of the camera aperture, lens focal length, and focus setting that capture the scene with the determined (at 508) DOF. In some embodiments, calculating (at 510) the camera settings includes adjusting one or more of the settings based on properties of the camera sensor, such as the sensor size, that may affect the DOF calculation.

Process 500 includes providing (at 512) the camera settings to one or more of the camera operator or to a programmable interface of the camera. For instance, imaging system 100 may notify the camera operator that one or more additional images of the scene are needed with the camera settings in order to generate the color-accurate 3D model of the scene. Alternatively, imaging system 100 may automatically configure the camera with the calculated (at 510) camera settings and/or may automatically activate the camera to capture the object or scene at the determined (at 508) DOF.

Process 500 includes receiving (at 514) additional 2D images of the scene (e.g., the same FOV) that the camera capture at the determined (at 508) DOF using the provided (at 512) camera settings. Process 500 includes defining (at 516) the non-positional elements of the second set of constructs based on the visual characteristics of in-focus pixels from the additional 2D images that are aligned with the second set of constructs.

In some embodiments, imaging system 100 may receive two or more images with differing in-focus visual characteristics for the same surface or point in a scene and that map to the same construct of a 3D model. For instance, the two or more images may capture a same part of the scene from different perspectives, positions, etc. and with an overlapping DOF. Different lighting, angles, reflections, and/or other visual distortions may change the visual characteristics that the two or more images capture for the same in-focus part of the scene that is represented by a particular construct of the model.

In some embodiments, imaging system 100 selects and attributes the visual characteristics from one of the two or more images that provide an in-focus capture of the scene part, surface, feature, or point. In some such embodiments, imaging system 100 may analyze the camera settings associated with each image, and select the visual characteristics from the image that captures the scene part, surface, feature, or point with an optimal DOF that is determined based on the position of the construct representing that scene part, surface, feature, or point in the 3D model. Alternatively, imaging system may select the visual characteristics from the image that captures the scene part, surface, feature, or point closest to the center of the image, closest to the center of the image DOF, and/or with whichever camera has the highest resolution sensor or most accurate lens.

In some other embodiments, imaging system 100 interpolates and/or combines the differing in-focus visual characteristics that are captured for the same scene part, surface, feature, or point in the different images. For instance, imaging system 100 may determine that an in-focus first pixel defined with a first set of visual characteristics in a first image and an in-focus second pixel defined with a second set of visual characteristics in a second image capture a particular part of a modeled object. Imaging system 100 identifies the particular construct from the 3D model of the modeled object that corresponds to that particular part, and defines the non-positional elements of the particular construct based on an average or other combination of the first set of visual characteristics and the second set of visual characteristics.

In some embodiments, the 2D images used by imaging system 100 for the color-accurate mapping may lack in-focus visual characteristics and/or image data for one or more meshes, polygons, points, or other constructs of a 3D model. In some such embodiments, imaging system 100 may complete the color-accurate mapping based on adjusted out-of-focus visual characteristics contained in the images for those undefined constructs and/or in-focus visual characteristics attributed to neighboring or nearby constructs.

Figure 6:
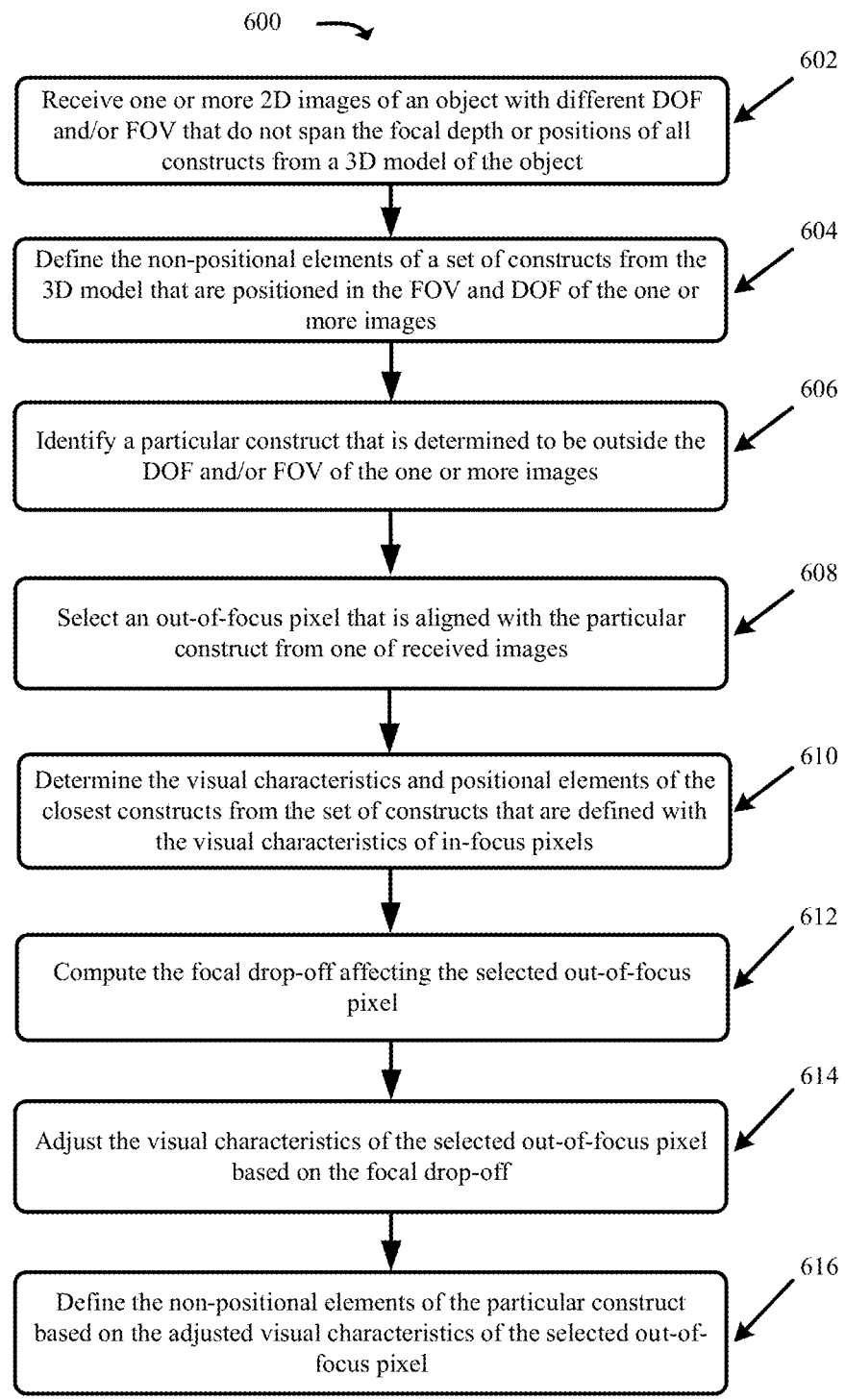
FIG. 6 presents a process for interpolating visual characteristics for undefined constructs of a 3D model that do not correspond to in-focus 2D image data in accordance with some embodiments presented herein.

FIG. 6 presents a process 600 for interpolating visual characteristics for undefined constructs of a 3D model that do not correspond to in-focus 2D image data in accordance with some embodiments presented herein. Process 600 is implemented by imaging system 100.

Process 600 includes receiving (at 602) one or more 2D images and a 3D model of an object. The one or more images have different DOF and/or FOV that do not span the focal depth or positions of all constructs from the 3D model.

Process 600 includes defining (at 604) the non-positional elements of a set of constructs from the 3D model that are positioned in the FOV and DOF of the one or more images. The non-positional elements of the set of constructs are defined (at 604) with the visual characteristics of in-focus pixels from the one or more images that are positionally aligned with the set of constructs and/or that provide an in-focus capture of the same surfaces represented by the set of constructs.

Process 600 includes identifying (at 606) a particular construct of the 3D model that is outside the DOF and/or FOV of the one or more images and that remains undefined as a result. For instance, the depth position defined for the particular construct positional elements is greater than or less than the DOF from each of the received (at 602) images.

Process 600 includes selecting (at 608) an out-of-focus pixel that is aligned with the particular construct from one of received (at 602) images. In some embodiments, imaging system 100 selects (at 608) the out-of-focus pixel that is aligned with the particular construct from the image that is least out-of-focus. In other words, imaging system 100 selects (at 608) the aligned out-of-focus pixel from whichever image has a DOF that is closest to the depth position of the particular construct.

Process 600 includes determining (at 610) the visual characteristics and positional elements of the closest constructs from the set of constructs that are defined with the visual characteristics of in-focus pixels. Process 600 includes computing (at 612) the focal drop-off affecting the selected (at 608) out-of-focus pixel based on a distance between the particular construct and the closest constructs and a softness measure that is derived from the difference in contrast in the visual characteristics attributed to the closet constructs and the difference in contrast in the visual characteristics between the selected (at 608) out-of-focus pixel and one or more surrounding or neighboring out-of-focus pixels.

Process 600 includes adjusting (at 614) the visual characteristics of the selected (at 608) out-of-focus pixel based on the focal drop-off. Specifically, imaging system 100 configures one or more image enhancement techniques to sharpen the visual characteristics of the out-of-focus pixel and/or bring the out-of-focus pixel into focus based on the focal drop-off. Adjusting (at 614) the visual characteristics may include interpolating the visual characteristics by prioritizing the color components that are similar to those of neighboring in-focus pixels or constructs and by deprioritizing the color components that are similar to those of neighboring out-of-focus pixels or constructs. Process 600 includes defining (at 616) the non-positional elements of the particular construct based on the adjusted (at 614) visual characteristics of the selected (at 608) out-of-focus pixel.

Figure 7:
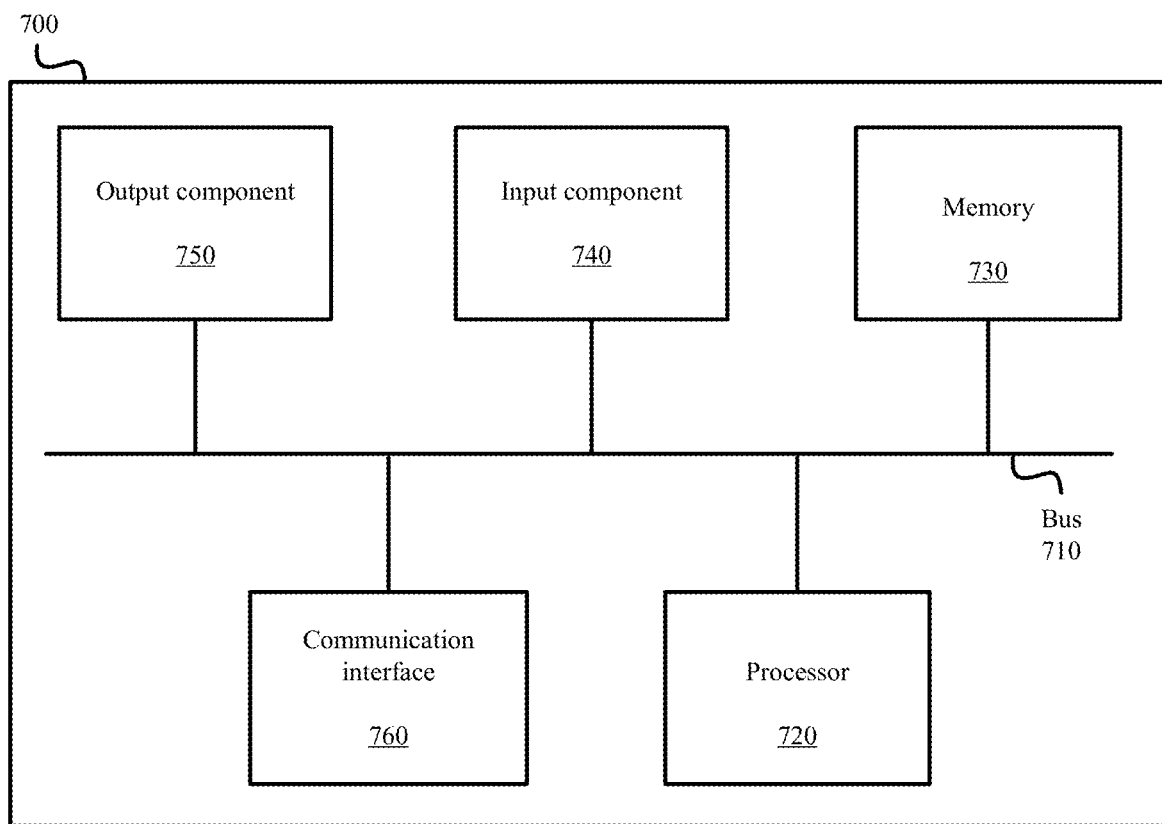
FIG. 7 illustrates example components of one or more devices, according to one or more embodiments described herein.

FIG. 7 is a diagram of example components of device 700. Device 700 may be used to implement one or more of the devices or systems described above (e.g., imaging system 100, the 3D scanner, camera, etc.). Device 700 may include bus 710, processor 720, memory 730, input component 740, output component 750, and communication interface 760. In another implementation, device 700 may include additional, fewer, different, or differently arranged components.

Bus 710 may include one or more communication paths that permit communication among the components of device 700. Processor 720 may include a processor, microprocessor, or processing logic that may interpret and execute instructions. Memory 730 may include any type of dynamic storage device that may store information and instructions for execution by processor 720, and/or any type of non-volatile storage device that may store information for use by processor 720.

Input component 740 may include a mechanism that permits an operator to input information to device 700, such as a keyboard, a keypad, a button, a switch, etc. Output component 750 may include a mechanism that outputs information to the operator, such as a display, a speaker, one or more LEDs, etc.

Communication interface 760 may include any transceiver-like mechanism that enables device 700 to communicate with other devices and/or systems. For example, communication interface 760 may include an Ethernet interface, an optical interface, a coaxial interface, or the like.

Communication interface 760 may include a wireless communication device, such as an infrared ("IR") receiver, a Bluetooth® radio, or the like. The wireless communication device may be coupled to an external device, such as a remote control, a wireless keyboard, a mobile telephone, etc. In some embodiments, device 700 may include more than one communication interface 760. For instance, device 700 may include an optical interface and an Ethernet interface.

Device 700 may perform certain operations relating to one or more processes described above. Device 700 may perform these operations in response to processor 720 executing software instructions stored in a computer-readable medium, such as memory 730. A computer-readable medium may be defined as a non-transitory memory device. A memory device may include space within a single physical memory device or spread across multiple physical memory devices. The software instructions may be read into memory 730 from another computer-readable medium or from another device. The software instructions stored in memory 730 may cause processor 720 to perform processes described herein. Alternatively, hardwired circuitry may be used in place of or in combination with software instructions to implement processes described herein. Thus, implementations described herein are not limited to any specific combination of hardware circuitry and software.

The foregoing description of implementations provides illustration and description, but is not intended to be exhaustive or to limit the possible implementations to the precise form disclosed. Modifications and variations are possible in light of the above disclosure or may be acquired from practice of the implementations.

The actual software code or specialized control hardware used to implement an embodiment is not limiting of the embodiment. Thus, the operation and behavior of the embodiment has been described without reference to the specific software code, it being understood that software and control hardware may be designed based on the description herein.

For example, while series of messages, blocks, and/or signals have been described with regard to some of the above figures, the order of the messages, blocks, and/or signals may be modified in other implementations. Further, non-dependent blocks and/or signals may be performed in parallel. Additionally, while the figures have been described in the context of particular devices performing particular acts, in practice, one or more other devices may perform some or all of these acts in lieu of, or in addition to, the above-mentioned devices.

Even though particular combinations of features are recited in the claims and/or disclosed in the specification, these combinations are not intended to limit the disclosure of the possible implementations. In fact, many of these features may be combined in ways not specifically recited in the claims and/or disclosed in the specification. Although each dependent claim listed below may directly depend on only one other claim, the disclosure of the possible implementations includes each dependent claim in combination with every other claim in the claim set.

Further, while certain connections or devices are shown, in practice, additional, fewer, or different, connections or devices may be used. Furthermore, while various devices and networks are shown separately, in practice, the functionality of multiple devices may be performed by a single device, or the functionality of one device may be performed by multiple devices. Further, while some devices are shown as communicating with a network, some such devices may be incorporated, in whole or in part, as a part of the network.

To the extent the aforementioned embodiments collect, store or employ personal information provided by individuals, it should be understood that such information shall be used in accordance with all applicable laws concerning protection of personal information. Additionally, the collection, storage and use of such information may be subject to consent of the individual to such activity, for example, through well-known "opt-in" or "opt-out" processes as may be appropriate for the situation and type of information. Storage and use of personal information may be in an appropriately secure manner reflective of the type of information, for example, through various encryption and anonymization techniques for particularly sensitive information.

Some implementations described herein may be described in conjunction with thresholds. The term "greater than" (or similar terms), as used herein to describe a relationship of a value to a threshold, may be used interchangeably with the term "greater than or equal to" (or similar terms). Similarly, the term "less than" (or similar terms), as used herein to describe a relationship of a value to a threshold, may be used interchangeably with the term "less than or equal to" (or similar terms). As used herein, "exceeding" a threshold (or similar terms) may be used interchangeably with "being greater than a threshold," "being greater than or equal to a threshold," "being less than a threshold," "being less than or equal to a threshold," or other similar terms, depending on the context in which the threshold is used.

No element, act, or instruction used in the present application should be construed as critical or essential unless explicitly described as such. An instance of the use of the term "and," as used herein, does not necessarily preclude the interpretation that the phrase "and/or" was intended in that instance. Similarly, an instance of the use of the term "or," as used herein, does not necessarily preclude the interpretation that the phrase "and/or" was intended in that instance. Also, as used herein, the article "a" is intended to include one or more items, and may be used interchangeably with the phrase "one or more." Where only one item is intended, the terms "one," "single," "only," or similar language is used. Further, the phrase "based on" is intended to mean "based, at least in part, on" unless explicitly stated otherwise.

What is claimed is:

1. A method comprising:
    receiving a two-dimensional ("2D") image of a scene, the 2D image comprising a plurality of pixels that capture visual characteristics of a plurality of points in the scene;
    receiving a three-dimensional ("3D") model of the scene, the 3D model comprising a plurality of constructs with each construct of the plurality of constructs comprising a set of positional elements that define a position of a different point from the plurality of points;
    determining a depth of field ("DOF") associated with the 2D image;
    selecting a set of the plurality of constructs in the DOF based on values defined for the set of positional elements of the set of constructs;
    determining a set of the plurality of pixels that represent a same set of points in the scene as the set of constructs; and
    mapping the visual characteristics of the set of pixels to a set of non-positional elements of the set of constructs.

2. The method of claim 1 further comprising:
obtaining one or more settings used to capture the 2D image; and
wherein determining the DOF comprises calculating the DOF based on the one or more settings.

3. The method of claim 2, wherein the one or more settings are included as metadata of the 2D image.

4. The method of claim 2, wherein the one or more settings comprise values for one or more of a camera aperture, lens focal length, and focus setting.

5. The method of claim 1, wherein determining the set of the plurality of pixels comprises:
determining that the set of constructs from the 3D model create one or more shapes, structures, or forms represented by the set of pixels of the 2D image.

6. The method of claim 1, wherein mapping the visual characteristics comprises:
overwriting values stored in the set of non-positional elements of each particular construct of the set of constructs with the visual characteristics of a pixel from the set of pixels that represents a same point in the scene as the particular construct.

7. The method of claim 1, wherein determining the DOF comprises:
identifying the set of pixels as a first set of the plurality of pixels that are in focus; and
identifying a different second set of the plurality of pixels as being out of focus.

8. The method of claim 1, wherein the 2D image is a first 2D image, the method further comprising:
receiving a second 2D image that captures the scene with a different second DOF;
selecting a second set of the plurality of constructs in the second DOF, wherein the second set of constructs comprises different constructs than the set of constructs in the DOF associated with the first 2D image;
determining a second set of pixels from the second 2D image that represent a same set of points in the scene as the second set of constructs; and
mapping the visual characteristics of the second set of pixels from the second 2D image to the second set of constructs.

9. The method of claim 1, wherein determining the DOF comprises:
converting camera settings used to capture the 2D image to a measure of the DOF.

10. The method of claim 1, wherein selecting the set of the plurality of constructs comprises:
determining that the set of positional elements of the set of constructs is defined with a depth value that is within the DOF; and
determining that the set of positional elements of a different second set of the plurality of constructs is defined with a depth value that is outside the DOF.

11. The method of claim 1, wherein the DOF is a first DOF, the method further comprising:
determining a full DOF for an in-focus capture of the plurality of points in the scene;
calculating a first set of camera settings with which to perform an in-focus capture of a first set of points in the scene at the first DOF, and a second set of camera settings with which to perform an in-focus capture of a different second set of the plurality of points in the scene at a second DOF, wherein the first DOF and the second DOF span the full DOF; and
providing the first set of camera settings and the second set of camera settings for a camera used to capture the 2D image.

12. The method of claim 1 further comprising:
determining that a second set of the plurality of constructs are positioned outside the DOF of the 2D image;
determining that the second set of constructs are positioned in a second DOF associated with a second 2D image of the scene;
determining one or more pixels of the second 2D image that represent a same set of points in the scene as the second set of constructs; and
mapping the visual characteristics of the one or more pixels to the set of non-positional elements of the second set of constructs.

13. An imaging system comprising:
one or more hardware processors configured to:
receive a two-dimensional ("2D") image of a scene, the 2D image comprising a plurality of pixels that capture visual characteristics of a plurality of points in the scene;
receive a three-dimensional ("3D") model of the scene, the 3D model comprising a plurality of constructs with each construct of the plurality of constructs comprising a set of positional elements that define a position of a different point from the plurality of points;
determine a depth of field ("DOF") associated with the 2D image;
select a set of the plurality of constructs in the DOF based on values defined for the set of positional elements of the set of constructs;
determine a set of the plurality of pixels that represent a same set of points in the scene as the set of constructs; and
map the visual characteristics of the set of pixels to a set of non-positional elements of the set of constructs.

14. The imaging system of claim 13, wherein the one or more hardware processors are further configured to:
obtain one or more settings used to capture the 2D image; and
wherein determining the DOF comprises calculating the DOF based on the one or more settings.

15. The imaging system of claim 13, wherein determining the set of the plurality of pixels comprises:
determining that the set of constructs from the 3D model create one or more shapes, structures, or forms represented by the set of pixels of the 2D image.

16. The imaging system of claim 13, wherein mapping the visual characteristics comprises:
overwriting values stored in the set of non-positional elements of each particular construct of the set of constructs with the visual characteristics of a pixel from the set of pixels that represents a same point in the scene as the particular construct.

17. The imaging system of claim 13, wherein determining the DOF comprises:
identifying the set of pixels as a first set of the plurality of pixels that are in focus; and
identifying a different second set of the plurality of pixels as being out of focus.

18. The imaging system of claim 13, wherein the 2D image is a first 2D image, and wherein the one or more hardware processors are further configured to:
receive a second 2D image that captures the scene with a different second DOF;

select a second set of the plurality of constructs in the second DOF, wherein the second set of constructs comprises different constructs than the set of constructs in the DOF associated with the first 2D image;

determine a second set of pixels from the second 2D image that represent a same set of points in the scene as the second set of constructs; and map the visual characteristics of the second set of pixels from the second 2D image to the second set of constructs.

19. The imaging system of claim 13, wherein the DOF is a first DOF, and wherein the one or more hardware processors are further configured to:

determine a full DOF for an in-focus capture of the plurality of points in the scene;

calculate a first set of camera settings with which to perform an in-focus capture of the set of points in the scene at the first DOF, and a second set of camera settings with which to perform an in-focus capture of a different second set of the plurality of points in the scene at a second DOF, wherein the first DOF and the second DOF span the full DOF; and provide the first set of camera settings and the second set of camera settings for a camera used to capture the 2D image.

20. A non-transitory computer-readable medium storing program instructions that, when executed by one or more hardware processors of an imaging system, cause the imaging system to perform operations comprising:

receive a two-dimensional ("2D") image of a scene, the 2D image comprising a plurality of pixels that capture visual characteristics of a plurality of points in the scene;

receive a three-dimensional ("3D") model of the scene, the 3D model comprising a plurality of constructs with each construct of the plurality of constructs comprising a set of positional elements that define a position of a different point from the plurality of points;

determine a depth of field ("DOF") associated with the 2D image;

select a set of the plurality of constructs in the DOF based on values defined for the set of positional elements of the set of constructs;

determine a set of the plurality of pixels that represent a same set of points in the scene as the set of constructs; and map the visual characteristics of the set of pixels to a set of non-positional elements of the set of constructs.

* * * * *